No. 763,187. PATENTED JUNE 21, 1904.
G. KELLAR & E. THOMASON.
VALVE FOR IRRIGATION STAND PIPES, &c.
APPLICATION FILED JAN. 26, 1904.
NO MODEL.
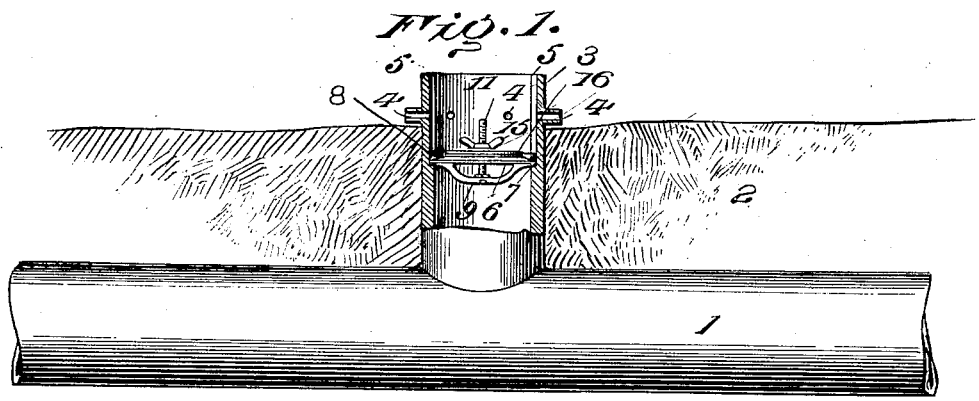
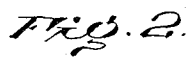
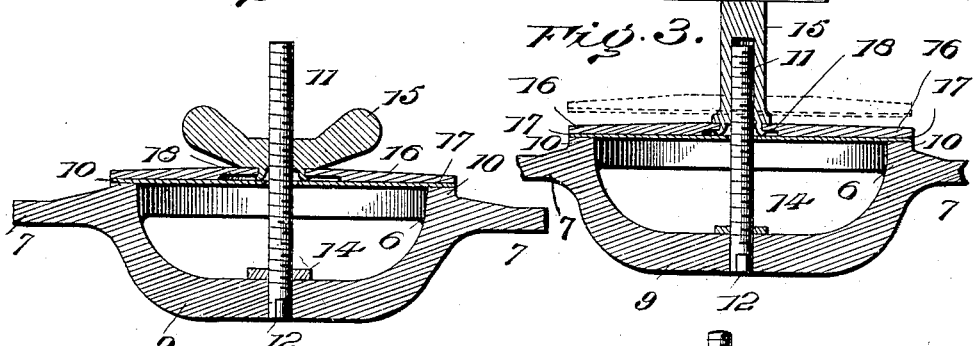
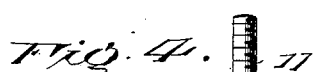
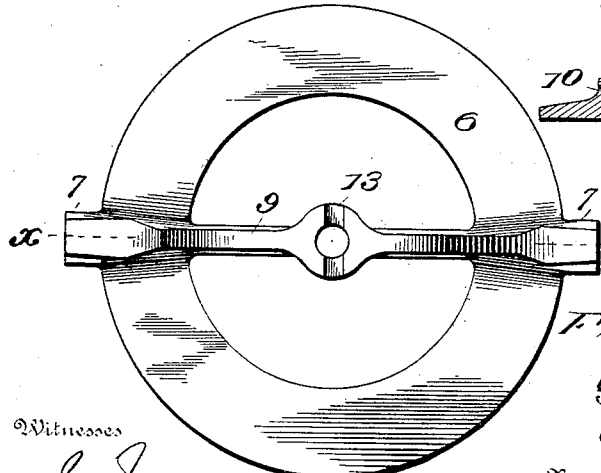
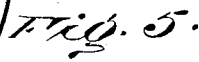
Witnesses
Inventors
George Kellar
Elmer Thomason
By Wm. C. McIntire
Attorney No. 763,187.                                                                                        Patented June 21, 1904.

UNITED STATES PATENT OFFICE.

GEORGE KELLAR AND ELMER THOMASON, OF COVINA, CALIFORNIA.

VALVE FOR IRRIGATION STAND-PIPES, &c.

SPECIFICATION forming part of Letters Patent No. 763,187, dated June 21, 1904.

Application filed January 26, 1904. Serial No. 190,731. (No model.)

*To all whom it may concern:*

Be it known that we, GEORGE KELLAR and ELMER THOMASON, citizens of the United States, residing at Covina, in the county of Los Angeles and State of California, have invented certain new and useful Improvements in Valves for Irrigation Stand-Pipes, &c.; and we do hereby declare the following to be a full, clear, and exact description of the invention; such as will enable others skilled in the art to which it appertains to make and use the same.

Our invention relates to certain new and useful improvements in valves for use principally in the stand-pipes of irrigating systems, but applicable to other uses also. It has for its object to provide a valve economic of construction, readily located in position, easily manipulated to regulate and control the flow of water, readily repaired when necessary, and so constructed that when the valve is open for the flow of water the water is unimpeded by the weight of the valve.

With these ends and objects in view our invention consists in the details of construction and arrangement hereinafter more fully explained.

In order that those skilled in the art to which our invention appertains may know how to make and use our improved valve and fully appreciate its advantages, we will proceed to describe the same, referring by numerals to the accompanying drawings, in which—

Figure 1 represents a portion of an irrigating system with the stand-pipe partly in section and showing one of our improved valves located therein and in closed condition. Fig. 2 is a central vertical section, upon enlarged scale, of the valve and taken on the line *x x* of Fig. 5. Fig. 3 is a similar section with the radial lugs partly broken away to avoid confusion with lines of Fig. 1 and showing a modification of the valve-operating nut, the dotted lines showing the valve in elevated position to allow the flow of water. Fig. 4 is a central vertical section transverse to that shown at Fig. 1, and Fig. 5 is a bottom view of the valve.

Similar reference-numerals indicate like parts in the several figures of the drawings.

1 represents a main or supply pipe located a suitable depth in the surface 2 to be irrigated. Connected in any suitable or well-known manner to the main 1 are a series of stand-pipes 3, extending above the surface and provided with radial spouts or conduits 4. These stand-pipes are formed with vertical grooves or niches 5, preferably diametrically located and for the purpose presently explained.

Within the vertical stand-pipes are arranged our improved valves, which are cast and consist of a ring 6, formed with radial lugs 7, adapted to be located in the vertical grooves 5 of the stand-pipe and to be seated at the bottoms or terminals of said grooves, and when so located the joint between the ring 6, lugs 7, and the stand-pipe is closed by hydraulic cement 8 in an obvious manner.

9 is a diametric vertically-disposed brace or arch cast integral with the ring 6 and preferably in alinement with the lugs 7. The upper surface of the ring 6 is slightly beveled, as clearly shown, and terminates at the inner circumference in a raised annular valve-seat 10.

As shown at Fig. 5, the brace or arch 9 is enlarged at the center and provided with a vertical channel, through which passes a screw 11, the lower end or head of which is formed with wings 12, adapted to be located in the diametric groove or recess 13 in the under side of the central enlarged part of the brace or arch, and 14 is a threaded nut by means of which the screw 11 is secured in proper relation with the brace or arch 9 and held in fixed vertical position. This screw 11 extends above the plane of the valve-seat 10 a suitable distance to receive a wing-nut 15, as shown at Fig. 2, or a T-shaped nut, as shown at Fig. 3.

16 is a disk plate, and 17 is a disk of sheet-rubber or other suitable packing.

The disk plate 16 is formed with a central recess 18 on the under side, and the wing or T-shaped nut 15 has its lower end shouldered to rest upon the top surface of the disk plate, and the extreme lower end is reduced and after passing through a central passage in the disk plate is flanged or turned outwardly in the recess 18 to constitute a swivel connection between the nut and the disk plate, as clearly shown in Figs. 2, 3, and 4.

The packing 17 makes a water-tight joint between the disk plate 16 and the seat 10 and also makes a water-tight joint with the screw 11, so that when the valve is closed water cannot escape from the stand-pipe 3. The swivel connection between the nut 15 and the valve-disk 16 and the relation of the nut and the screw 11 are such that when the valve-disk is raised by turning the nut 15 the water is free to flow between the valve-disk and the valve-seat 10, the nut serving to sustain the weight of the valve-disk, and thus to relieve the pressure which would otherwise be exerted upon the column of water.

The screw 11 being formed with the head or wings 12 and the bridge or arch 9 with the radial groove or recess 13 enables the said screw to be readily located in position and secured by the jam-nut 14 and permits of the ready separation of the parts when repairs become necessary.

All of the parts of our improved valve are, as will be obvious, interchangeable and are easy and economic of manufacture.

By reason of the construction and arrangement of the several parts and the swivel connection between the operating-nut 15 and the disk 16 it will be readily seen that the disk 16 may be readily raised and lowered into position without grinding or rotating upon the packing 17, thus avoiding the wearing out or abrasion of the same.

The valve-disk can be opened to any desired extent or entirely removed without changing the location or arrangement of the other parts.

By reason of the radial lugs 7 and the vertical grooves 5 the valve may be located at any desired altitude by interposing cement or other suitable support between the lugs and the lower extremity of the grooves 5.

The arch or bridge 9, being located below the ring 6, constitutes a rigid support for the vertical screw 11 and in no wise interferes with the entire removal of the disk 16 when necessary.

While our improved valve is especially adapted for use in connection with the stand-pipes of irrigating systems, it will be understood that they may be advantageously used in connection with ordinary hydrants or sewer connections.

While we have shown and described our improved valve as circular in form, it will be obvious that it may be otherwise designed without departing from the spirit of our invention, which resides in the generic feature of combining with a suitable valve-seat and packing of a valve disk or plate adapted to be raised and lowered by an operating-nut swiveled to the disk or plate in such manner as to receive the column of water from the gravity-weight of the valve disk or plate.

What we claim as new, and desire to secure by Letters Patent, is—

1. A valve for stand-pipes, hydrants, &c., consisting of a cast body having a water-passage therethrough and adapted to be secured in position, and provided with a centrally-arranged screw in combination with a closing-plate having a swivel-nut connected therewith and adapted to travel upon the centrally-arranged screw and a suitable packing between the body and closing-plate, substantially as and for the purpose set forth.

2. In combination with the body or ring 6, and arch or bridge 9, cast integral, and said arch or bridge formed with a vertical passage and a diametric groove or recess 13, a screw 11, formed with radial wings 12, and a jam-nut 14, threaded upon the screw 11, substantially as and for the purpose set forth.

3. In a valve such as described, a closing-disk and a threaded nut revolubly connected with respect to each other, in combination with a vertically-disposed screw upon which the disk and nut are adapted to travel, substantially as hereinbefore set forth.

In testimony whereof we have signed our names to this specification in the presence of two subscribing witnesses.

GEORGE KELLAR.
   ELMER THOMASON.

Witnesses:
 E. P. WARNER,
 W. H. LAVAYEA.